United States Patent [19]

Brodie

[11] 4,117,581

[45] Oct. 3, 1978

[54] MULTI-PURPOSE PULLER

[76] Inventor: Michael Brodie, P.O. Box 64, Vilna, Canada, T0A 3L0

[21] Appl. No.: 815,588

[22] Filed: Jul. 14, 1977

[51] Int. Cl.² .............................................. B23P 17/04

[52] U.S. Cl. ...................................................... 29/261

[58] Field of Search ................. 29/256, 258, 259, 261, 29/262

[56] References Cited

U.S. PATENT DOCUMENTS

| | | | |
|---|---|---|---|
| 1,394,129 | 10/1921 | Wickerham | 29/261 |
| 1,688,535 | 10/1928 | Ellis et al. | 29/261 |
| 2,188,074 | 1/1940 | Condon | 29/261 |

FOREIGN PATENT DOCUMENTS

| | | | |
|---|---|---|---|
| 452,036 | 10/1949 | Italy | 29/261 |

*Primary Examiner*—James L. Jones, Jr.
*Attorney, Agent, or Firm*—Stanley G. Ade

[57] ABSTRACT

Three jaws are pivoted to a head carrying the pressure screw or bolt. One jaw is pivotally secured to one side of the head and the other two jaws are normally situated at 120° one upon each side of the first jaw and are also pivotally secured to the head. Means are provided to move these two jaws to a position in spaced and parallel relationship opposite to said first jaw and also to swing the first jaw between these two jaws so that the puller can be used as an internal puller. This movement can be achieved either by unbolting the two jaws and re-positioning same or using a U-bolt attachment which permits the two jaws to be slid from one position to another thus enabling the puller to be used as a two or three-jaw puller and upon external or internal objects to be pulled.

10 Claims, 4 Drawing Figures

MULTI-PURPOSE PULLER

BACKGROUND OF THE INVENTION

This invention relates to new and useful improvements in pullers, particularly pullers adapted to be used to remove such items as gears or bearings from shafts, or internal bearings, oil seals and the like from cavities.

Conventional so-called universal pullers are available, but usually require all of the jaws to be removed and reversed when changing from external pulling to internal pulling and vice-versa. Furthermore, such pullers are usually provided with either two jaws or three jaws so that two pullers are normally required. When a three-jaw puller is provided, the jaws are normally situated approximately 120° from one another and a two-jaw puller is usually provided with two jaws situated approximately 180° from one another.

It is therefore apparent that at least two pullers are required either of which requires disassembling and re-assembling when changing from internal to external use and vice-versa.

SUMMARY OF THE INVENTION

The present invention overcomes these disadvantages by providing a puller assembly which can be used as a two or three-jaw puller and can be used internally or externally without disassembling the jaws from the head.

One object of the invention is therefore to provide a device of the character herewithin described which comprises a head, a pressure bolt screw threadably engaging through said head, a first jaw pivotally secured by one end thereof to one side of said head, a second and third jaw, means pivotally securing said second and third jaws to said head spaced from said first jaw, article engaging hooks on the other ends of all of said jaws, and means to position said second and third jaws in either of two positions relative to said first jaw, one position being whereby said three jaws are substantially at 120° from one another, and the other position being whereby said second and third jaws are in spaced and parallel relationship with one another.

Another object of the invention is to provide a device of the character herewithin described in which the puller is easily moved from a two to three-jaw puller and vice-versa readily and easily.

A further object of the invention is to provide a device of the character herewithin described which is easily changed from an internal to an external puller and vice-versa.

Yet another object of the invention is to provide a device of the character herewithin described in which the jaws can be clamped in the desired position when used as an internal puller, in order to prevent relative movement between the jaws.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 4:
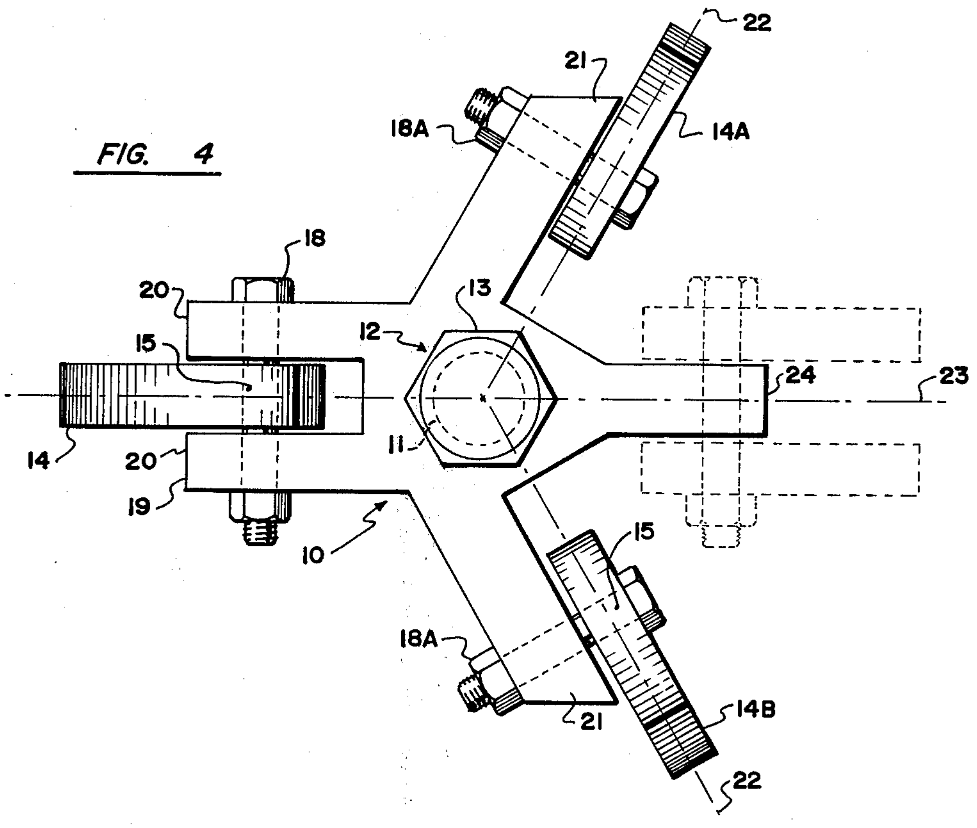
FIG. 4 is a top plan view of an alternative embodiment of the puller.

Proceeding therefore to describe the invention in detail, and dealing first with FIG. 4, reference character 10 illustrates a head having a screw threaded aperture 11 extending through the center thereof into which is engaged a pressure bolt or screw 12 having a standard hexagonal head 13 on the upper end and a screw threaded shank 14 extending downwardly therefrom engaging the screw threaded aperture 11.

Figure 1:
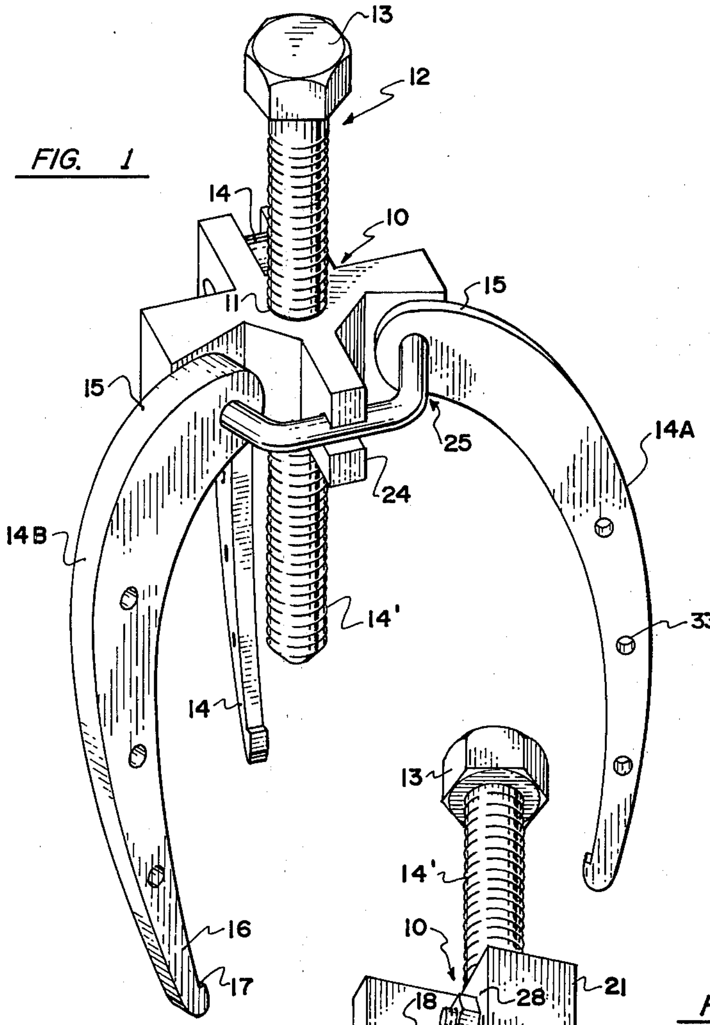
FIG. 1 is an isometric view of the preferred embodiment shown as a three-jaw external puller.
Figure 2:
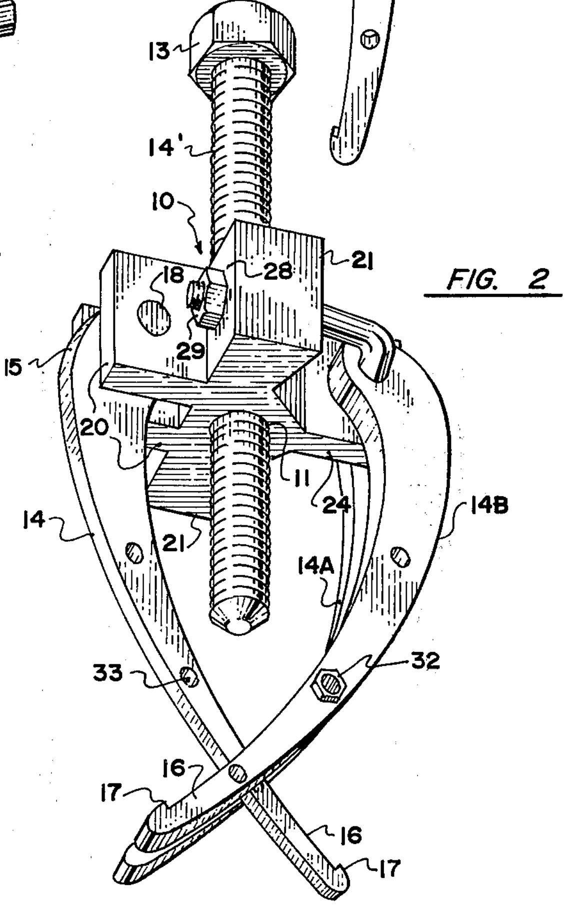
FIG. 2 is an isometric view similar to FIG. 1 but reversed with reference thereto and showing the puller in use as an internal puller.

A first jaw 15 consists of a curved member preferably formed from flat stock as illustrated in FIGS. 1 and 2 and including a somewhat enlarged upper end 15' tapering downwardly to the distal end 16 upon which an article engaging hook 17 is formed in the usual way.

The enlarged upper portion 15' is apertured transversely and a pivot in the form of a nut and bolt assembly 18 extends through a mounting portion 19 extending upon one side of the head 10 and the portion 15'.

The mounting portion 19 is formed of two bearing portions 20 which are spaced and parallel so that the portion 15' of the jaw 15 engages therebetween as clearly shown in the drawings.

Second and third jaws 15A and 15B are formed similar to jaw 15 and are mounted to the head in either one of two positions.

Mounting portions 21 are formed on the head 10 and extend with the longitudinal axes 22 thereof lying at 120° from one another and also from the longitudinal axis 23 of the head as clearly illustrated in FIG. 4. The jaws 15A and 15B are pivotally secured to these mounting portions 21 by means of nut and bolt assemblies 18A when in the position illustrated in full line in FIG. 4.

However, an alternative position is provided by detaching the jaws 15A and 15B from the mounting portions 21 and re-connect them by one of these nut and bolt assemblies, one upon each side of a common mounting portion 24, extending from the head 10 in a line situated between the mounting portions 21. This common mounting portion 24 lies on the longitudinal axis 23 of the head as clearly illustrated.

Figure 3:
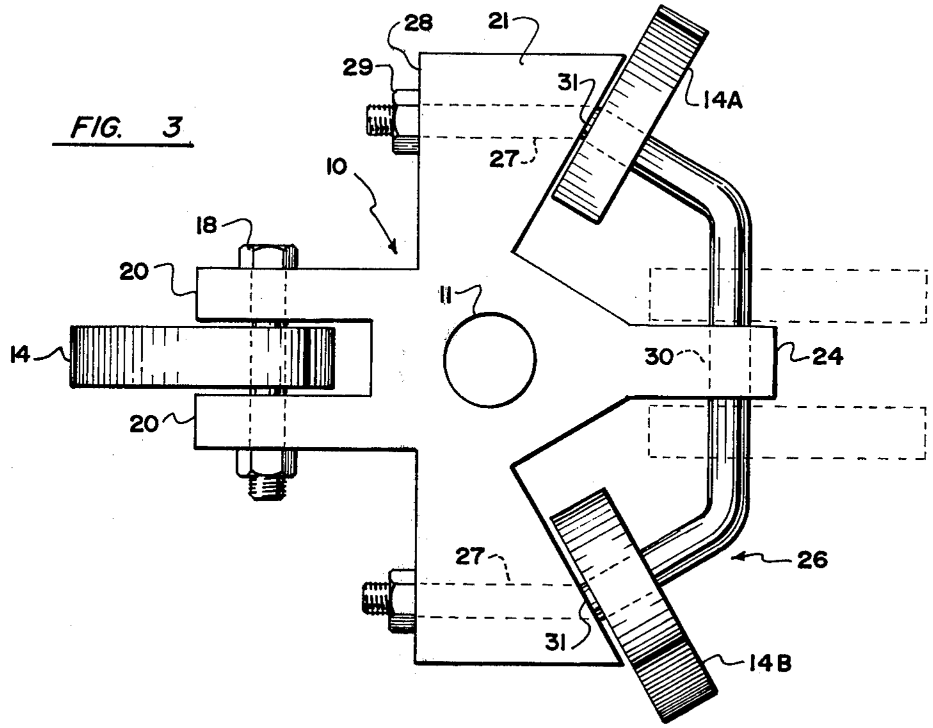
FIG. 3 is a top plan view of the preferred embodiment of the puller.

FIGS. 1, 2 and 3 show the preferred embodiment in which the head is formed in a similar manner to that illustrated and described relative to FIG. 4 with the exception that a cut-out portion 25 is formed in the common mounting portion in the form of a recess (see FIG. 1).

Means are provided to mount the second and third jaws 15A and 15B for pivotal movement to the head, said means taking the form of a U-bolt assembly collectively designated 26.

This U-bolt assembly shown most clearly in FIG. 3, includes a pair of spaced and parallel arms 27 which engage apertures formed through the mounting portions 21 parallel to the longitudinal axis 23, the shape of these mounting portions being modified to the extent that the rear faces or the faces adjacent the one jaw 15, extend at right angles to the longitudinal axis 23 to allow the nuts 29 to screw threadably engage the extending ends of the parallel portions 27 of the U-bolt as clearly illustrated.

A center section 30 of the U-bolt nests within the recess on cut-out portion 25 of the common mounting portion 24 and lies at right angles to the longitudinal axis 23 of the head.

This center section or portion 30 extends outwardly upon either side of the common mounting portion 24 and then extends diagonally to join the parallel portions 27 of the U-bolt assembly adjacent the opposite faces 31 of the mounting portions 21.

The second and third jaws 15A and 15B each are pivotally mounted upon the portion of the U-bolt assembly between faces 31 and the common mounting portion 24 and the drillings or bores formed through the ends 15' of these second and third jaws are of a diameter sufficient to allow the jaws to be slid from the position shown in full line in FIG. 3 to the position shown in phantom and vice-versa.

In operation, and assuming that the puller is to be used as a three-jaw external puller, the jaws are positioned as shown in full line in FIGS. 3 and 4 depending upon which embodiment is used whereupon the jaws can be swung into position over the object to be pulled with the pressure bolt engaging a fixed portion such as a shaft (not illustrated) in the usual manner. It will be appreciated that the jaws are fully adjustable from the minimum to the maximum position by pivoting same upon the respective mounting portions.

However, under some circumstances, it is not possible to engage three jaws around the object to be pulled because of confined space and the like under which circumstances, the operator has two choices.

Firstly, he may position the second and third jaws 15A and 15B adjacent the common mounting portion 24 either by the method described relative to FIG. 4 or by the preferred method illustrated and described in the remaining drawings. At this point, and if sufficient room is available, both the now spaced and parallel second and third jaws 15A and 15B may be engaged over the object together with the first jaw 15 whereupon the puller is actuated in a manner somewhat similar to a two-jaw puller. Alternatively, one of the jaws 15A or 15B may be swung upwardly clear of the work piece so that the puller operates as a two-jaw puller.

When it is desired to use the puller internally to pull an internal bearing or oil seal or the like, the second and third jaws are positioned as illustrated in phantom in FIGS. 3 and 4 whereupon these two jaws are are swung across towards the first jaw 15 which is also swung across so that it engages between the second and third jaws as clearly shown in FIG. 2. This permits the necessary adjustment of the relationship of the jaws to be made and to engage the internal parts to be pulled.

Under certain circumstances, internal pulling causes difficulties in the maintenance of the hooked ends 17 with the parts to be pulled. There is, therefore, provided a nut and bolt assembly 32 selectively engageable through drillings or apertures 33 formed in the second and third jaws intermediate the ends thereof. This nut and bolt assembly then clamps the first jaw 15 between the second and third jaws in the desired position and prevents relative movement occurring therebetween. If desired, a plurality of apertures 33 may be provided in the jaws 15A and 15B so that the jaws can be clamped as aforesaid in various relationships.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A puller selectively usable as a two-jaw puller, a three-jaw puller, an internal puller and an external puller and comprising in combination a head, a pressure bolt screw threadably engageable through said head, a first jaw pivotally secured by one end thereof to one side of said head, a second and third jaw, means pivotally securing said second and third jaws by one end thereof, to said head spaced from said first jaw, a primary mounting portion formed on said head for said second jaw, a further primary mounting portion formed on said head for said third jaw, a common mounting portion formed on said head between said primary mounting portions, article engaging hooks on the other ends of all of said jaws, and means to position said second and third jaws in either of two positions relative to said first jaw, one position being whereby said three jaws are substantially at 120° from one another, and the other position being whereby said second and third jaws are in side by side, spaced and parallel relationship with one another, said means to pivotally secure said second and third jaws taking the form of a U-bolt assembly secured by the ends thereof to said primary mounting portions and engaging through said common mounting portion, said second and third jaws being pivoted on the portion of said U-bolt assembly extending between said primary mounting portions and said common mounting portion and being slidable from one of said positions to the other of said positions and vice-versa.

2. The puller according to claim 1 in which said means to pivot said second and third jaws comprises a detachable bolt assembly extending through said jaws and the respective mounting portion.

3. The puller according to claim 1 in which said head is in the form of a block and includes a pair of spaced and parallel bearing portions on said one side thereof, said first jaw being pivotally secured therebetween, said common mounting portion extending on the opposite side of said block parallel with said bearing portions, said primary mounting portions extending from said block one upon each side of said common mounting portion and being spaced therefrom, the longitudinal axes of each of said primary mounting portions being substantially 120° from the longitudinal axes of said bearing portion and said common mounting portion.

4. The puller according to claim 1 in which said one jaw is selectively engageable between said second and third jaws when in said other position, for use as an internal puller, and clamp bolt means selectively engaging between said second and third jaws to clamp said one jaw between said second and third jaws to prevent relative pivotal movement between any of said jaws.

5. The puller according to claim 2 in which said one jaw is selectively engageable between said second and third jaws when in said other position, for use as an internal puller, and clamp bolt means selectively engaging between said second and third jaws to clamp said one jaw between said second and third jaws to prevent relative pivotal movement between any of said jaws.

6. The puller according to claim 3 in which said one jaw is selectively engageable between said second and third jaws when in said other position, for use as an internal puller, and clamp bolt means selectively engaging between said second and third jaws to clamp said one jaw between said second and third jaws to prevent relative pivotal movement between any of said jaws.

7. A puller selectively usable as a two-jaw puller, a three-jaw puller, an internal puller and an external puller and comprising in combination a head, a pressure bolt screw threadably engageable through said head, a first jaw pivotally secured by one end thereof to one side of said head, a second and third jaw, means pivotally securing said second and third jaws by one end thereof to said head spaced from said first jaw, article engaging hooks on the other ends of all of said jaws, and means to position said second and third jaws in either of two positions relative to said first jaw, one position being whereby said three jaws are substantially at 120° from one another, and the other position being whereby said second and third jaws are in side by side, spaced and parallel relationship with one another, said one jaw being selectively engageable between said second and third jaws when in said other position, for use as an internal puller, and clamp bolt means selectively engaging between said second and third jaws to clamp said one jaw between said second and third jaws to prevent relative pivotal movement between any of said jaws.

8. The puller according to claim 7 in which said means to position said second and third jaws in either of two positions includes a primary mounting portion formed on said head for said second jaw, a further primary mounting portion formed on said head for said third jaw, a common mounting portion formed on said head between said primary mounting portions, and means to pivotally secure said second and third jaws each to one of said mounting portions respectively when said jaws are in 120° relationship with one another and to pivotally secure said second and third jaws one upon each side of said common mounting portion when in said spaced and parallel relationship with one another.

9. The puller according to claim 8 in which said means to pivot said second and third jaws comprises a detachable bolt assembly extending through said jaws and the respective mounting portion.

10. The puller according to claim 8 in which said means to pivotally secure said second and third jaws takes the form of a U-bolt assembly secured by the ends thereof to said primary mounting portions and engaging through said common mounting portion, said second and third jaws being pivoted on the portion of said U-bolt assembly extending between said primary mounting portions and said common mounting portion and being slidable from one of said positions to the other of said positions and vice-versa.

* * * * *